US008046148B2

(12) United States Patent
Sekine et al.

(10) Patent No.: US 8,046,148 B2
(45) Date of Patent: Oct. 25, 2011

(54) TRAVELING SAFETY DEVICE FOR VEHICLE

(75) Inventors: Hiroshi Sekine, Shioya-gun (JP); Yoichi Sugimoto, Utsunomiya (JP); Hideki Hiratsuka, Shimotsuke (JP); Ryohei Kanamori, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1087 days.

(21) Appl. No.: 11/826,260

(22) Filed: Jul. 13, 2007

(65) Prior Publication Data

US 2008/0015765 A1  Jan. 17, 2008

(30) Foreign Application Priority Data

Jul. 14, 2006 (JP) ................. 2006-194446

(51) Int. Cl.
*G05D 1/00* (2006.01)
(52) U.S. Cl. ............... 701/78; 701/65; 701/70; 701/71; 701/72; 701/79; 303/155; 340/438; 340/439
(58) Field of Classification Search .............. 701/65, 701/71, 72, 70, 78, 79, 83, 93, 96, 207, 301; 303/155, DIG. 2; 340/435, 436, 437, 438, 340/439
See application file for complete search history.

(56) References Cited

U.S. PATENT DOCUMENTS

| 7,433,772 | B2 * | 10/2008 | Isaji et al. ................. 701/71 |
| 7,848,886 | B2 * | 12/2010 | Kawasaki .................... 701/301 |
| 2004/0133324 | A1 * | 7/2004 | Yasui et al. .................... 701/41 |

FOREIGN PATENT DOCUMENTS

| JP | 2003-063369 A | 3/2003 |
| JP | 2004-142653 A | 5/2004 |
| JP | 2004-148998 A | 5/2004 |

OTHER PUBLICATIONS

Japanese Language Office action with English Translation, JP Application No. 2006-194446, Apr. 5, 2011.

* cited by examiner

*Primary Examiner* — Gertrude Arthur Jeanglaude
(74) *Attorney, Agent, or Firm* — Arent Fox LLP

(57) ABSTRACT

A traveling safety device for a vehicle of the present invention includes a brake device, a brake operation detecting device, a storage device, a present vehicle position detecting device, a vehicle state detecting device, a road shape recognizing device, a proper vehicle state setting device, a comparing device, a brake assist control device, a brake assist control device. The brake assist control device calculates an initial brake assist pressure based on a comparison result of the comparing device, and changes a brake assist pressure in proportion to the brake operation of the driver when a change in the brake operation by the driver has been detected after start of brake assist control based on the initial brake assist pressure.

5 Claims, 5 Drawing Sheets

TRAVELING SAFETY DEVICE FOR VEHICLE

Priority is claimed on Japanese Patent Application No. 2006-194446, filed Jul. 14, 2006, and the contents of that are incorporated herein by reference.

BACKGROUND OF THE INVENTION

1. Field of the Invention

The present invention relates to a traveling safety device for a vehicle, and specifically, to a traveling safety device for a vehicle provided with a brake assist system that assists in decelerating the vehicle if a driver has the intention of decelerating the vehicle.

2. Description of the Related Art

Conventionally, a system (hereinafter referred to as "collision prevention brake assist system") that assists in decelerating a vehicle for prevention of a collision is known. In this collision prevention brake assist system, its greatest object is to reduce the braking time by a driver's brake operation to shorten the stopping distance of the vehicle. Therefore, a brake assist pressure is determined at an early stage of a brake operation (at an early stage of stepping of a brake pedal). Then, even in the subsequent brake assist pressure, a maximum brake force is secured till release of the brake pedal irrespective of a change in the force of stepping by the driver.

Further, a system (hereinafter referred to as "curve entering brake assist system") that assists in decelerating a vehicle when a brake operation by a driver has been detected before the vehicle enters a curve so that the vehicle can pass properly through the curve is known (refer to Japanese Unexamined Patent Application, First Publication No. 2003-63369). In this curve entering brake assist system, whether or not deceleration assist is required before the vehicle enters the curve is determined. If it is determined that the deceleration assist is required, a brake assist pressure is set.

Meanwhile, the object of the curve entering brake assist system is to assist a driver in adjusting speed when the vehicle enters the curve, and a final control target speed is determined by a driver's will. However, if the brake assist pressure that has been set once is maintained till completion of the brake assist control, the driver will fell a sense of discomfort when the driver tries to change the stepping force of the brake pedal to make a speed adjustment, after the setting of the brake assist pressure.

Thus, an object of the present invention is to provide a traveling safety device for a vehicle capable of making it easy to make a speed adjustment when the vehicle enters a curve, according to a driver's intention.

SUMMARY OF THE INVENTION

The present invention employed the followings in order to achieve the above object.

That is, a traveling safety device for a vehicle of the present invention is provided with: a brake device that generates a brake force by a brake pressure, to brake a present vehicle; a brake operation detecting device that detects driver's brake operation; a storage device that stores a road data; a present vehicle position detecting device that detects a position of the present vehicle; a vehicle state detecting device that detects a vehicle state of the present vehicle; a road shape recognizing device that recognizes a road shape that exists in a traveling direction of the present vehicle based on the road data stored in the storage device; a proper vehicle state setting device that sets a proper vehicle state where the vehicle is able to properly pass through the recognized road, based on the road shape recognized by the road shape recognizing device; a comparing device that compares the vehicle state detected by the vehicle state detecting device with the proper vehicle state set by the proper vehicle state setting device; and a brake assist control device that increases brake pressure when the driver's brake operation has been detected by the brake operation detecting device if the vehicle state of the present vehicle is not the proper vehicle state as a result of the comparison by the comparing device. The brake assist control device calculates an initial brake assist pressure based on the comparison result of the comparing device, and changes a brake assist pressure in proportion to the brake operation of the driver when a change in the brake operation by the driver has been detected after start of brake assist control based on the initial brake assist pressure.

According to this traveling safety device for a vehicle, when a driver has changed a brake operation after start of brake assist control, the brake assist pressure changes in proportion to the driver's brake operation. Thus, the driver's intention of increasing or reducing brake pressure is reflected in the brake assist. In addition, as an example of the road shape recognizing device, a curve recognizing device that recognizes a curve, or an intersection recognizing device that recognizes an intersection can be given.

According to this traveling safety device for a vehicle, when a driver has changed a brake operation after start of brake assist control, the brake assist pressure changes in proportion to the driver's brake operation. Thus, the driver's intention of increasing or reducing brake pressure is reflected in the brake assist, and it becomes easy for the driver to make a speed adjustment.

It may be arranged such that: the brake device includes a master cylinder that transmits the driver's brake operating force; and the brake assist control device adopts as a reference value a ratio between the pressure of the master cylinder and the brake assist pressure after a predetermined time from the start of brake assist control, and calculates the brake assist pressure based on the reference value and the increased or reduced master cylinder pressure, when an increase or reduction in the master cylinder pressure has been detected after elapse of the predetermined time.

In this case, the brake assist pressure according to an increase or reduction in master cylinder pressure is calculated based on the ratio between the pressure of the master cylinder and the brake assist pressure after a predetermined time from the start of brake assist control. Thus, a driver can be prevented from feeling a sense of discomfort to a change in brake assist pressure.

It may be arranged such that: the brake device includes a master cylinder that transmits the driver's brake operating force; and the brake assist control device adopts as a reference value a ratio between the pressure of the master cylinder and the brake assist pressure at the time of the holding of a brake operation, when holding of a brake operation by the driver has been detected after the start of brake assist control, and calculates the brake assist pressure based on the reference value and the increased or reduced master cylinder pressure, when an increase or reduction in the master cylinder pressure has been detected after the holding of a brake operation.

In this case, the brake assist pressure according to an increase or reduction in master cylinder pressure is calculated based on the ratio between the pressure of the master cylinder and the brake assist pressure at the time of holding of a brake operation. Thus, a driver can be prevented from feeling a sense of discomfort to a change in brake assist pressure.

It may be arranged such that: the brake device includes a master cylinder that transmits the driver's brake operating force, and a brake wheel cylinder that generates the brake force; and the brake assist control device adopts as a reference value a ratio between the pressure of the master cylinder and the pressure of the brake wheel cylinder after a predetermined time from the start of brake assist control, and calculates the brake assist pressure based on the reference value and the increased or reduced master cylinder pressure, when an increase or reduction in the master cylinder pressure has been detected after elapse of the predetermined time.

In this case, the brake assist pressure according to an increase or reduction in master cylinder pressure is calculated based on the ratio between the pressure of the master cylinder and the pressure of the brake wheel cylinder after a predetermined time from the start of brake assist control. Thus, a driver can be prevented from feeling a sense of discomfort to a change in brake assist pressure.

It may be arranged such that: the brake device includes a master cylinder that transmits the driver's brake operating force, and a brake wheel cylinder that generates the brake force; and the brake assist control device adopts as a reference value a ratio between the pressure of the master cylinder and the pressure of the brake wheel cylinder at the time of the holding of a brake operation, when holding of a brake operation by the driver has been detected after the start of brake assist control, and calculates the brake assist pressure based on the reference value and the increased or reduced master cylinder pressure, when an increase or reduction in the master cylinder pressure has been detected after the holding of a brake operation.

In this case, the brake assist pressure according to an increase or reduction in master cylinder pressure is calculated based on the ratio between the pressure of the master cylinder and the pressure of the brake wheel cylinder at the time of holding of a brake operation. Thus, a driver can be prevented from feeling a sense of discomfort to a change in brake assist pressure.

BRIEF DESCRIPTION OF THE DRAWINGS

FIG. 4A is a graph showing a ratio R1 at a normal time, and FIG. 4B is a graph showing a ratio R1 at a high degree of urgency.

DETAILED DESCRIPTION OF THE INVENTION

Hereinafter, one embodiment of a traveling safety device for a vehicle according to the present invention will be described with reference to FIGS. 1 to 5.

Figure 1:
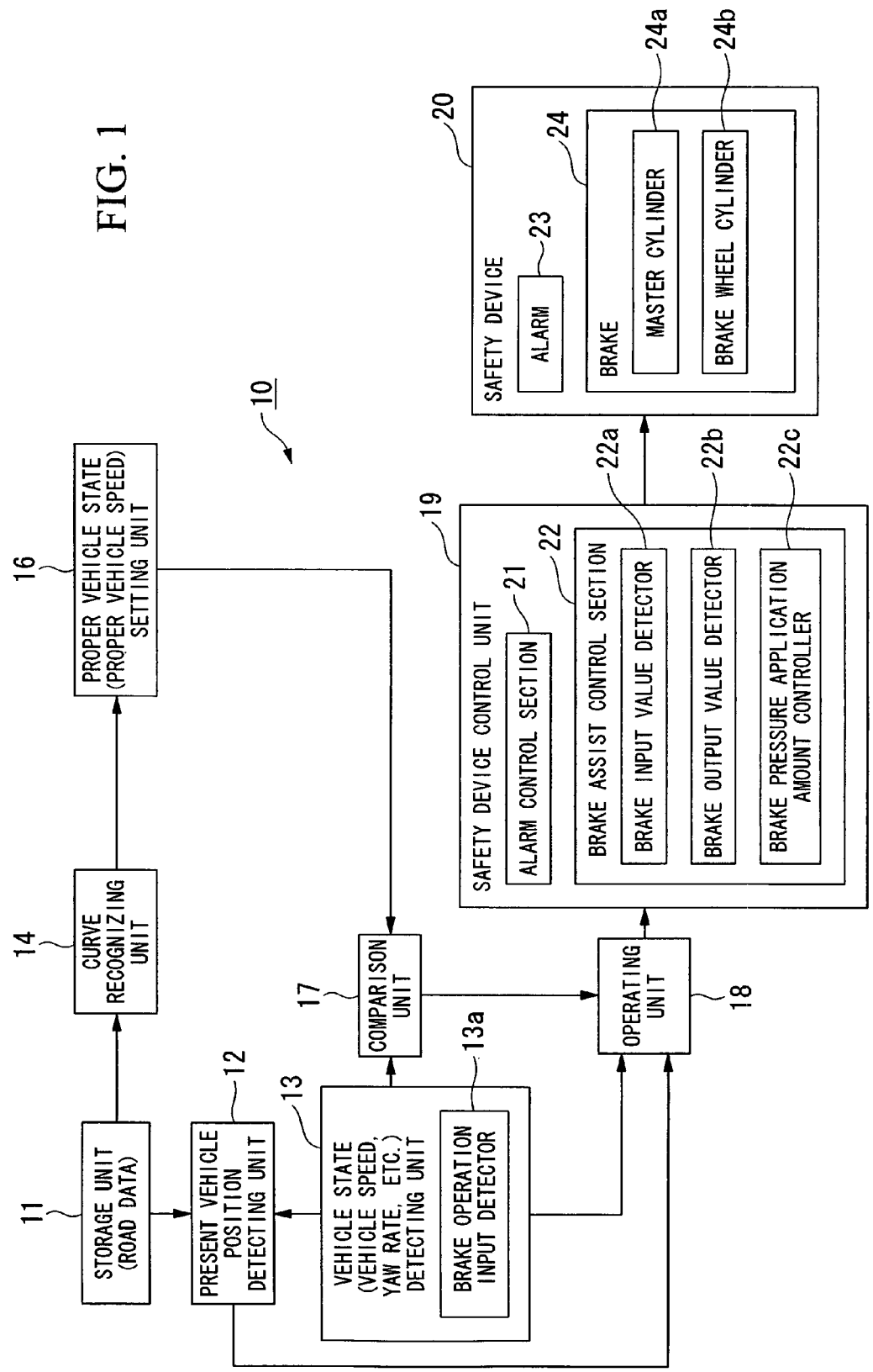
FIG. 1 is a functional block diagram showing one embodiment of a traveling safety device for a vehicle according to the present invention.

As shown in FIG. 1, a traveling safety device 10 for a vehicle in the present embodiment includes, for example, a storage unit (storage device) 11, a present vehicle position detecting unit (present vehicle position detecting device) 12, a vehicle state detecting unit (vehicle state detecting device) 13, a curve recognizing unit (curve recognizing device, road shape recognizing device) 14, a proper vehicle state setting unit (proper vehicle state setting device) 16, a comparison unit (comparing device) 17, an operating unit (operating device) 18, a safety device control unit 19, and a safety device 20.

The storage unit 11 stores node information and curve information related to a road as road data. The node information is, for example, data of coordinate points for grasping a road shape. The curve information is composed of, for example, information related to the curvature of a curve (for example, the curvature or radius R, and polarity of a curve), and information related to the depth of a curve (for example, a turning angle θ or a curve length that is required for passage through a curve), in addition to the starting point and ending point of a curve that is set on a link (that is, a line that connects individual nodes together).

The present vehicle position detecting unit 12 calculates the current position of a present vehicle by calculation processing of autonomous navigation based on a positioning signal, such as a signal from a GPS (Global Positioning System) for measuring the position of a vehicle, for example, using a satellite, or a signal from a DGPS (Differential Global Positioning System) for correcting the error of the GPS signal, for example, using a proper base station to improve positioning accuracy, or a detection signal output from the vehicle state detecting unit 13 as will be described below.

Moreover, the present vehicle position detecting unit 12 performs map matching based on the calculated current position of the present vehicle, and the road data acquired from the storage unit 11, and corrects the result of position estimation by autonomous navigation.

The vehicle state detecting unit 13 includes, for example, a brake operation input detector (brake operation input detecting device) 13a composed of a brake pedal sensor that detects the operation and operation amount of a brake pedal, a vehicle speed sensor or wheel speed sensor that detects the current speed of the present vehicle, a gyro sensor or yaw rate sensor that detects the direction of the present vehicle in a horizontal plane or the angle of inclination with respect to a vertical direction (for example, the angle of inclination of the longitudinal axis of the present vehicle with respect to the vertical direction, a yaw angle that is the rotation angle of the gravity center of the vehicle around the vertical axis, etc.), and the amount of change (for example, yaw rate, etc.) of the angle of inclination, a steering angle sensor that detects a steering angle (the direction and magnitude of a steering angle input by a driver) and an actual steering angle (wheel turning angle) according to the steering angle, a steering torque sensor that detects a steering torque, etc. Also, the vehicle state detecting unit outputs individual detection signals to the present vehicle position detecting unit 12, the comparison unit 17, and the operating unit 18.

The curve recognizing unit 14 acquires the road data stored in the storage unit 11, and recognizes a curve that exists on a predetermined range of a front road in a traveling direction from the current position of the present vehicle based on this road data. For example, the curve recognizing unit 14 recognizes the shape of a curve (the shape of a recognized curve) based on coordinate points for grasping node information, i.e., road shape, and link information that is a line that connects individual nodes together.

Moreover, the curve recognizing unit 14 detects the starting point position and shape of a curve (for example, the radius R or curvature of a curve, a turning angle θ, the curve length of the curve, depth of the curve, etc.) that have been recognized ahead in the traveling direction of the present vehicle, based on the curve information included in the road data acquired from the storage unit 11, and outputs them to the proper vehicle state setting unit 16.

The proper vehicle state setting unit 16 calculates the vehicle speed (proper vehicle speed) of the present vehicle at which the vehicle can properly pass through the recognized curve shape, based on the recognized curve shape recognized by the curve recognizing unit 14, and outputs it to the comparison unit 17. In addition, the proper vehicle state setting unit 16 can calculate a lateral acceleration (proper lateral acceleration) that is permitted when the present vehicle properly passes through a recognized curve, and can calculate a proper vehicle speed from this proper lateral acceleration.

Further, the proper vehicle state setting unit 16 calculates a distance (proper curve distance) that is required when deceleration is properly made from the current vehicle speed of the present vehicle to the proper vehicle speed thereof.

The comparison unit 17 compares the current vehicle state (vehicle speed, etc.) of the present vehicle detected by the vehicle state detecting unit 13 with the proper vehicle state (proper vehicle speed, etc.) set by the proper vehicle state setting unit 16, and outputs the comparison result to the operating unit 18.

The safety device 20 includes, for example, an alarm 23 and a brake 24. The brake 24 is provided with a master cylinder 24a that converts the stepping force of a brake pedal depressed by a driver into hydraulic pressure, and forcibly feeds it to a pressure regulator, and a brake wheel cylinder 24b that generates a brake force under the hydraulic pressure increased to predetermined pressure by the pressure regulator.

The safety device control unit 19 is provided with an alarm control section 21 and a brake assist control section 22.

The alarm control section 21 controls the operation of the alarm 23 of the safety device 20.

The brake assist control section 22 is provided with a brake input value detector 22a, a brake output value detector 22b, and a brake pressure application amount controller 22c. The brake input value detector 22a detects master cylinder pressure as a brake input value. The brake output value detector 22b detects brake wheel cylinder pressure as a brake output value. The brake pressure application amount controller 22c calculates a brake assist pressure based on the brake input value (master cylinder pressure) detected by the brake input value detector 22a. The pressure regulator of the brake 24 is controlled using the pressure obtained by adding this brake assist amount to the brake input value as brake output.

The operating unit 18 determines whether or not the safety device 20 is to be operated based on the comparison result in the comparison unit 17, and a detection result of the brake operation input detector 13a, and operates the safety device control unit 19 based on the determination result.

For example, if the comparison result of the comparison unit 17 is not a proper vehicle state like a state where the current vehicle speed of the present vehicle is higher than a proper vehicle speed, and if stepping (brake operation input) of a brake pedal by a driver has been detected by the brake operation input detector 13a, the alarm 23 is operated via the alarm control section 21, thereby raising the driver's caution, or brake assist by the brake 24 is executed via the brake assist control section 22, thereby automatically assisting in decelerating the present vehicle.

Figure 2:
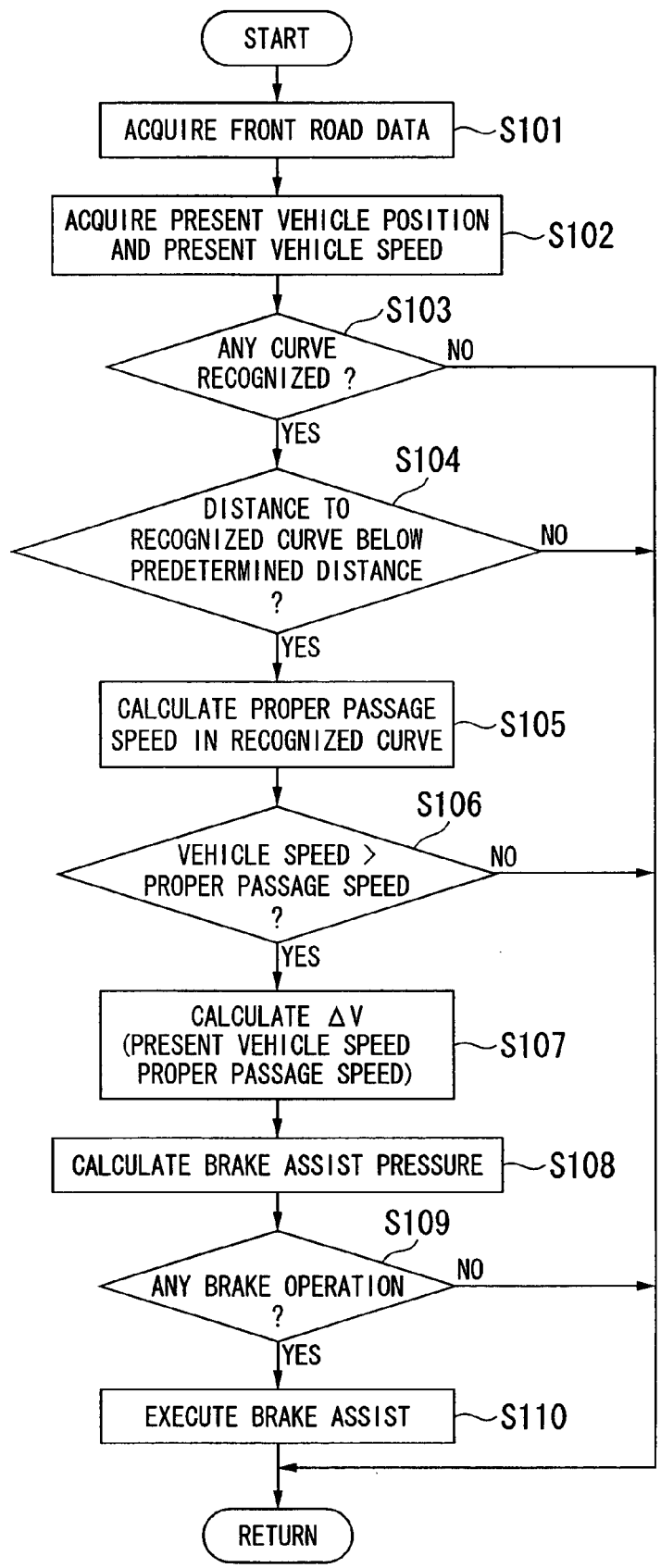
FIG. 2 is a flow chart of an operation determination processing of brake assist control in the traveling safety device.

Next, the operation of the traveling safety device 10 for a vehicle in the present embodiment, especially the operation determination processing for the brake assist control section 22 in the operating unit 18 will be described according to the flow chart of FIG. 2.

First, in Step S101, the data of a front road in the traveling direction of the present vehicle that is stored in the storage unit 11 is acquired.

Next, the process proceeds to Step S102 where the current position and vehicle speed of the present vehicle are acquired.

Next, the process proceeds to Step S103 where it is determined whether or not a curve has been recognized ahead in the traveling direction based on the road data.

If the determination result in Step S103 is "NO" (no recognition), the vehicle is out of a range of application of curve entering assist control. Thus, execution of this routine is once completed.

On the other hand, if the determination result in Step S103 is "YES" (with recognition), the process proceeds to Step S104 where it is determined whether or not the distance to a curve (recognized curve) that has been recognized is below a predetermined distance.

If the determination result in Step S104 is "NO" (larger than a predetermined distance), the vehicle is out of a range of application of curve entering assist control. Thus, execution of this routine is once completed.

If the determination result in Step S104 is "YES" (below a predetermined distance), the process proceeds to Step S105 where a proper passage vehicle speed in the recognized curve is calculated.

Next, the process proceeds to Step S106 where it is determined whether or not the vehicle speed of the present vehicle is larger than the proper passage vehicle speed.

If the determination result in Step S106 is "NO" (below the proper passage vehicle speed), it is not necessary to execute brake assist. Thus, execution of this routine is once completed.

On the other hand, if the determination result in Step S106 is "YES" (greater than or equal to the proper passage vehicle speed), the process proceeds to Step S107 where a speed difference $\Delta V$ is calculated by subtracting the proper passage vehicle speed from the vehicle speed of the present vehicle.

Next, the process proceeds to Step S108 where an initial brake assist pressure is calculated according to the speed-difference $\Delta V$.

Then, the process proceeds to Step S109 where it is determined whether or not there is any brake operation by a driver. That is, when stepping (brake operation input) of a brake pedal is detected by the brake operation input detector 13a, it is determined that there is a brake operation, and when stepping of the brake pedal is not detected, it is determined that there is no brake operation.

If the determination result in Step S109 is "NO" (no brake pedal operation), it is not necessary to execute brake assist. Thus, execution of this routine is once completed.

If the determination result in Step S109 is "YES" (with brake pedal operation), the process proceeds to Step S110 where brake assist control is executed, and execution of this routine is once completed.

Figure 3:
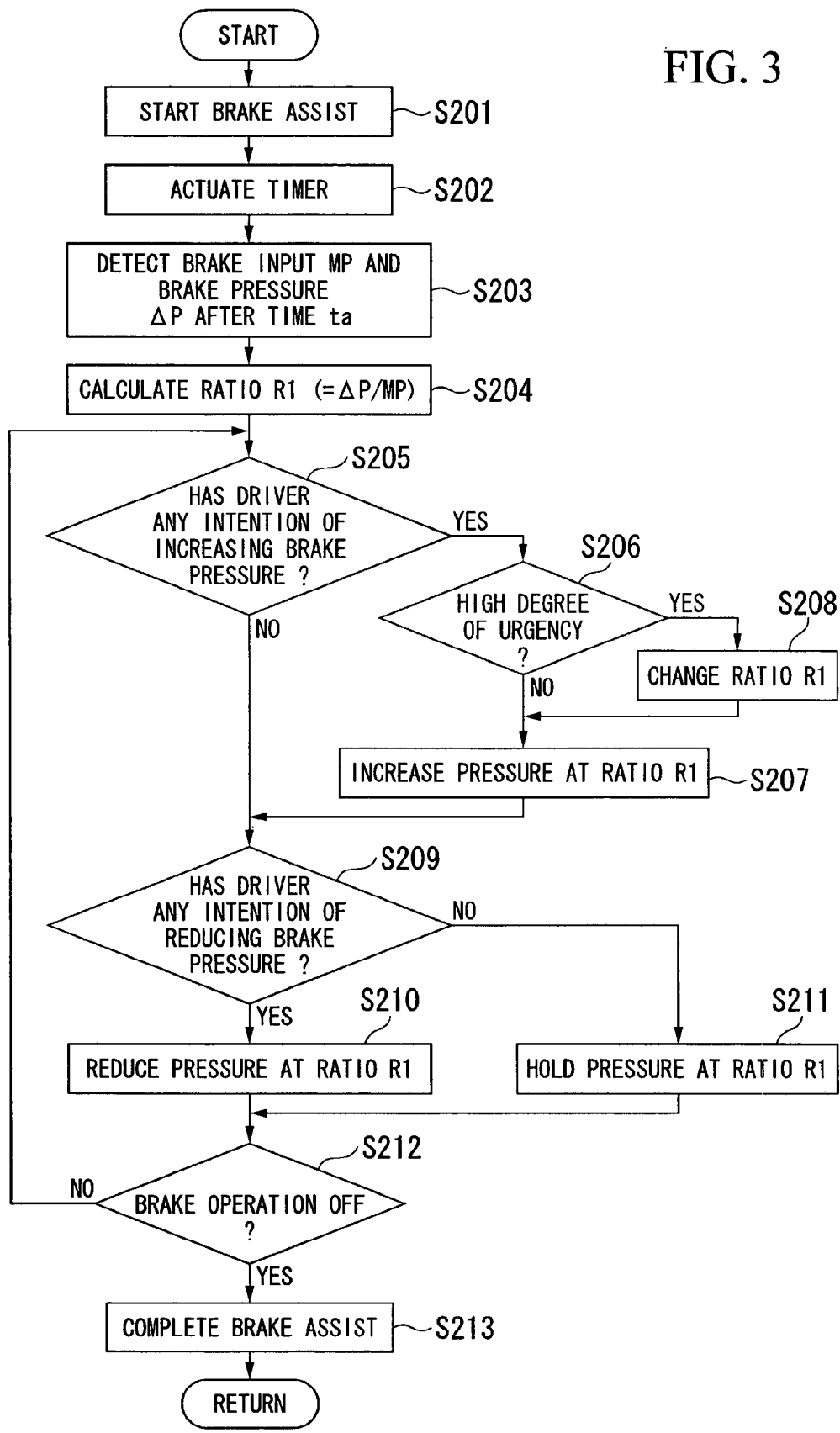
FIG. 3 is a flow chart of the brake assist control in the traveling safety device.
Figure 4B:
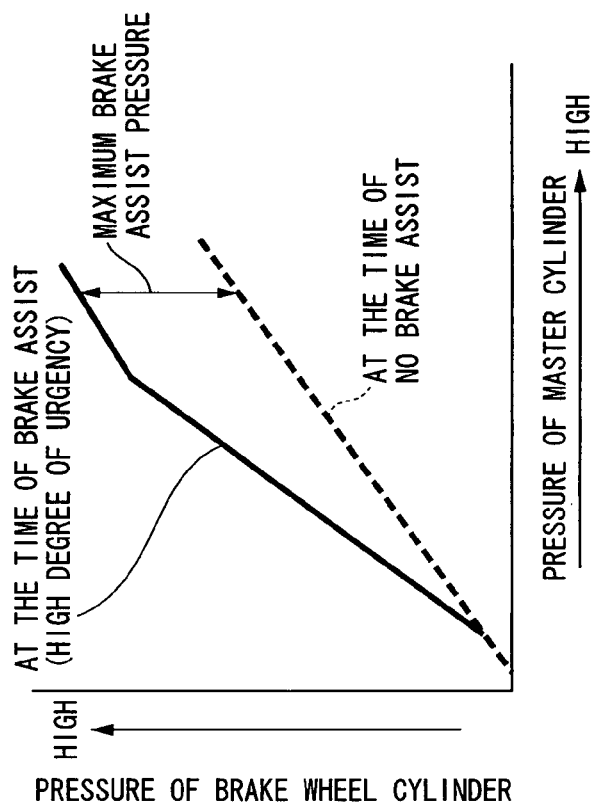
FIGS. 4A and 4B are graphs showing an example of the ratio R1 between brake input MP and brake assist pressure ΔP, and specifically.
Figure 4A:
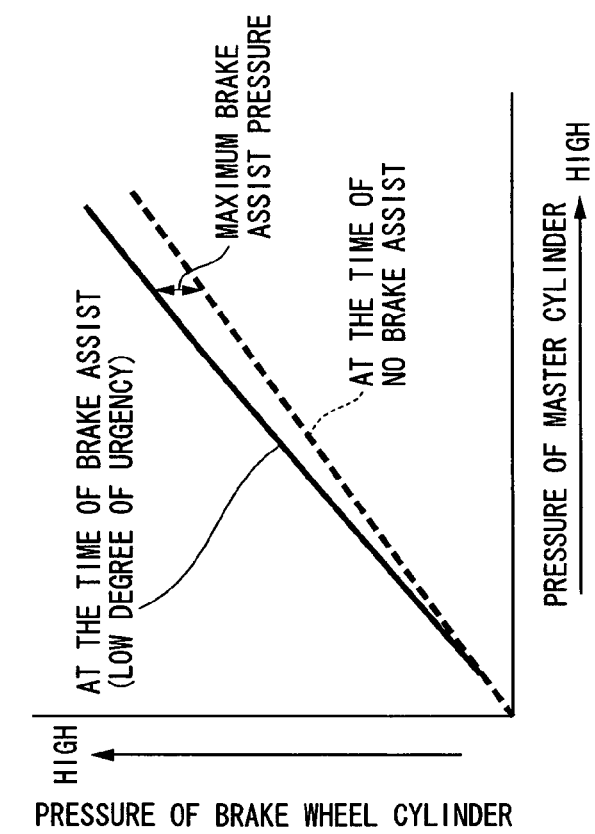

Next, the brake assist control in Step S110 will be described according to the flow chart of FIG. 3.

In Step S201, brake assist according to the initial brake assist pressure is started.

Next, a timer is actuated in Step S202 to count the elapsed time from the starting point of the brake assist.

Next, the process proceeds to Step S203 where brake input MP after predetermined time ta from the start of the brake assist and a brake assist pressure $\Delta P$ are detected. In addition, the brake input MP is master cylinder pressure, and the brake assist pressure $\Delta P$ is calculated by subtracting the master cylinder pressure from brake wheel cylinder pressure.

Next, the process proceeds to Step S204 where the ratio R1 (=ΔP/MP) between the brake input MP and the brake assist pressure ΔP is calculated.

Next, the process proceeds to Step S205 where it is determined whether or not a driver has the intention of increasing brake pressure. The driver's intention of increasing and reducing brake pressure can be detected based on, for example, a change in the stepping amount or stepping force of a brake pedal. Specifically, if there is no change in the stepping amount or stepping force of the brake pedal, it can be determined that the driver has no intention of increasing and reducing brake pressure (that is, the driver has the intention of holding the brake pressure). Also, if an increase in the stepping amount or stepping force of the brake pedal is detected, it can be determined that the driver has the intention of increasing brake pressure. Further, if a reduction in the stepping amount or stepping force of the brake pedal is detected, it can be determined that the driver has the intention of reducing brake pressure.

If the determination result in Step S205 is "YES" (with an intension of increasing brake pressure), the process proceeds to Step S206 where it is determined whether or not the degree of urgency of deceleration is high. Whether or not the degree of urgency is high can be determined based on the stepping speed of the brake pedal by the driver, etc. For example, if the stepping speed is no more than a predetermined threshold value, it is determined that the degree of urgency is low, and if the stepping speed is above the threshold value, it is determined that the degree of urgency is high.

If the determination result in Step S206 is "NO" (low degree of urgency), the process proceeds to Step S207 where the ratio R1 (=ΔP/MP) between the brake input MP and the brake assist pressure ΔP is kept, and the brake assist pressure ΔP is increased in proportion to an increase in brake input MP.

On the other hand, if the determination result in Step S206 is "YES" (high degree of urgency), the process proceeds to Step S208 where the ratio R1 (=ΔP/MP) between the brake input MP and the brake assist pressure ΔP is changed to a large value. For example, the ratio R1 at a normal time (at a low degree of urgency) is set like FIG. 4A, whereas the ratio R1 at a high degree of urgency is set to a value that is larger than the ratio R1 at a normal time like FIG. 4B, and a maximum brake assist pressure at a high degree of urgency is made larger than a maximum brake assist pressure at a normal time.

After processing of Step S208 is executed, the process proceeds to Step S207 where the brake assist pressure ΔP is increased in proportion to an increase in brake input MP based on the ratio R1 (=ΔP/MP) after the change.

After processing of Step S207 is executed, or if the determination result in Step S205 is "NO" (no intension of increasing brake pressure), the process proceeds to Step S209 where it is determined whether or not the driver has the intention of reducing brake pressure.

If the determination result in Step S209 is "YES" (with an intension of reducing brake pressure), the process proceeds to Step S210 where the ratio R1 (=ΔP/MP) between the brake input MP and the brake assist pressure ΔP is kept, and the brake assist pressure ΔP is increased in proportion to a reduction in brake input MP.

If the determination result in Step S210 is "NO" (no intension of reducing brake pressure), the process proceeds to Step S211 where the ratio R1 (=ΔP/MP) is kept, and the brake assist pressure ΔP is kept.

Then, the process proceeds from Steps S210 or S211 to Step S212 where it is determined whether or not the brake operation by the driver has disappeared (OFF).

If the determination result in Step S212 is "NO" (continuing the brake operation), the process returns to Step S205 where processing of Steps S205 to S212 is repeated.

If the determination result in Step S212 is "YES" (no brake operation), the process proceeds to Step S213 where the brake assist is completed.

Figure 5:
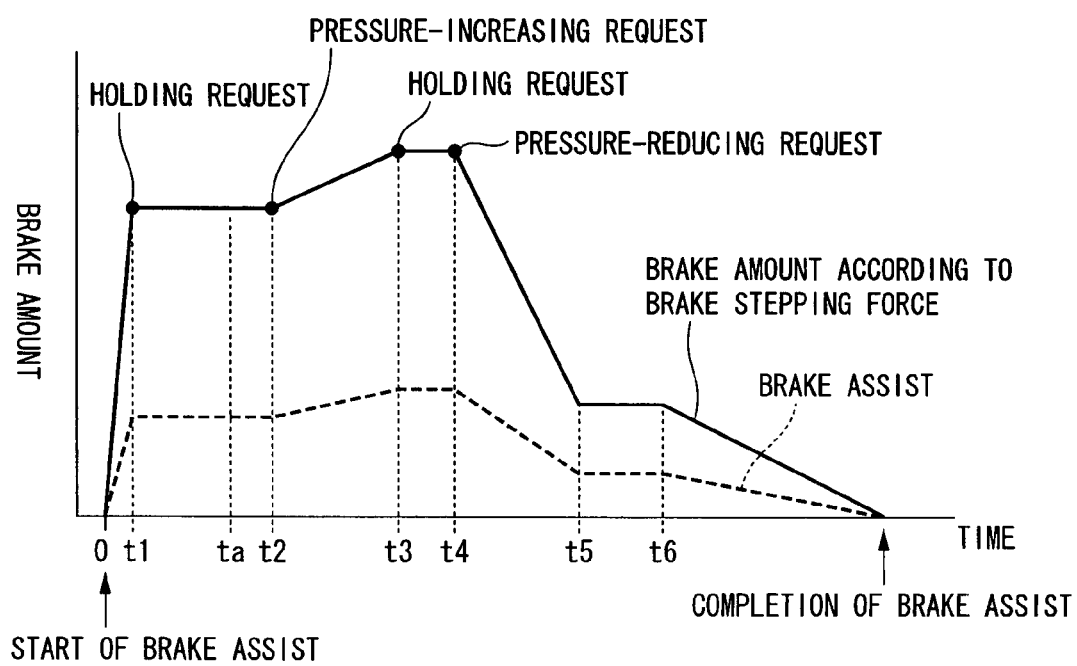
FIG. 5 is a time chart that shows an example of a change in the amount of braking during execution of brake assist.

A specific example of a change in the amount of braking during execution of the brake assist of the present embodiment will be described with reference to FIG. 5.

Brake assist is started by stepping of a brake pedal by a driver. Immediately after the start of the brake assist, the amount of braking based on a brake stepping force increases sharply to a predetermined value according to a stepping amount, and the brake assist amount also increases sharply to an initial brake assist amount.

Then, suppose that the predetermined time ta has lapsed while the driver does not change the stepping amount of the brake pedal between points of time t1 to t2. In this case, the ratio R1 (=ΔP/MP) between the brake input MP and the brake assist pressure ΔP at the time ta is calculated.

Thereafter, when there is a driver's request for increasing brake pressure (intention of increasing brake pressure) at the point of time t2, the brake assist amount is increased in proportion to an increase in brake input MP based on the ratio R1 (=ΔP/MP). In addition, the ratio R1 (=ΔP/MP) is a ratio R1 at the time ta in the case of a normal time (at a low degree of urgency), and becomes a ratio R1 after a change that is set based on the map of FIG. 4B in the case of a high degree of urgency.

Thereafter, when there is a driver's request for holding brake pressure (intention of holding brake pressure) at a point of time t3, a brake assist amount at the point of time t3 is kept.

Thereafter, when there is a driver's request for reducing brake pressure (intention of reducing brake pressure) at a point of time t4, the brake assist amount is reduced in proportion to a reduction in brake input MP, with the ratio R1 (=ΔP/MP) kept.

Thereafter, when there is again a driver's request for holding brake pressure (intention of holding brake pressure) at a point of time t5, a brake assist amount at the point of time t5 is kept.

Thereafter, when there is again a driver's request for reducing brake pressure (intention of reducing brake pressure) at a point of time t6, the brake assist amount is reduced in proportion to a reduction in brake input MP, with the ratio R1 (=ΔP/MP) kept.

As described above, according to the traveling safety device 10 for a vehicle of the present embodiment, when a driver has changed a brake operation (the stepping amount or stepping force of a brake pedal) after start of brake assist control, the brake assist pressure changes in proportion to the driver's brake operation. Thus, the driver's intention of increasing or reducing brake pressure can be reflected in the brake assist. As a result, it becomes easy for the driver to make a speed adjustment.

Moreover, based on the ratio R1 (=ΔP/MP) between the master cylinder pressure MP and the brake assist pressure ΔP after the predetermined time ta from the start of brake assist control, the brake assist pressure ΔP is increased or reduced according to a change in master cylinder pressure MP, with this ratio R1 kept. Thus, a driver can be prevented from feeling a sense of discomfort to a change in brake assist pressure, and the driver can make a speed adjustment without discomfort.

Further, when the degree of urgency is high, the ratio R1 (=ΔP/MP) between the brake input MP and the brake assist pressure ΔP is changed to a large value. Thus, the brake assist pressure in an emergency can be made larger than that at a normal time, and it becomes easy for a driver to make a speed adjustment.

The aforementioned embodiment has been described that the ratio R1 (=ΔP/MP) between the master cylinder pressure MP and the brake assist pressure ΔP after the predetermined time ta from the start of brake assist control is adopted as a reference value. However, when holding of a brake operation by a driver has been detected after the start of brake assist control, the ratio R1 (=ΔP/MP) between the master cylinder pressure MP at the time of the holding of a brake operation, and the brake assist pressure ΔP may be adopted as a reference value.

The aforementioned embodiment has been described that the ratio R1 (=ΔP/MP) between the master cylinder pressure MP and the brake assist pressure ΔP after the predetermined time ta from the start of brake assist control is adopted as a reference value, and the brake assist pressure ΔP is increased or reduced according to a change in master cylinder pressure MP, with this ratio R1 kept. However, the ratio R2 (=WP/MP) between the master cylinder pressure MP and brake wheel cylinder pressure WP after the predetermined time ta from the start of brake assist control may be adopted as a reference value, and the brake assist pressure ΔP may be increased or reduced according to a change in master cylinder pressure MP, with this ratio R2 kept. Even in this case, when holding of a brake operation by a driver has been detected after the start of brake assist control, the ratio R2 (=WP/MP) between the master cylinder pressure MP at the time of the holding of a brake operation, and the brake wheel cylinder pressure WP may be adopted as a reference value. Even in such a case, a driver can be prevented from feeling a sense of discomfort to a change in brake assist pressure, and the driver can make a speed adjustment without discomfort.

In addition, the present invention is not limited to the aforementioned embodiment.

For example, although the aforementioned embodiment has been described that the ratio R1 is changed at a high degree of urgency, the present invention is established even if the ratio is not changed. In that case, Steps S206 and S208 may be omitted, and if the determination result in Step S205 is "YES," the process may proceed to Step S207.

Further, the aforementioned embodiment has been described that the road shape recognizing device is constituted by a curve recognizing device that recognizes the shape of a curve that exists in the traveling direction of a present vehicle. However, the present invention can also be applied to a traveling safety device in which the road shape recognizing device is constituted by an intersection recognizing device that recognizes the shape of an intersection that exists in the traveling direction of a present vehicle, and brake assist control is performed before the vehicle enters the recognized intersection.

While a preferred embodiment of the present invention has been described and illustrated above, it should be understood that this is an exemplary of the present invention and is not to be considered as limiting. Additions, omissions and substitutions, and other modifications can be made without departing from the spirit or scope of the present invention. Accordingly, the present invention is not to be considered as being limited by the foregoing description, and is only limited by the scope of the appended claims.

What is claimed is:

1. A traveling safety device for a vehicle comprising:
   a brake device that generates a brake force by a brake pressure, to brake a present vehicle;
   a brake operation detecting device that detects driver's brake operation;
   a storage device that stores a road data;
   a present vehicle position detecting device that detects a position of the present vehicle;
   a vehicle state detecting device that detects a vehicle state of the present vehicle;
   a road shape recognizing device that recognizes a road shape that exists in a traveling direction of the present vehicle based on the road data stored in the storage device;
   a proper vehicle state setting device that sets a proper vehicle state where the vehicle is able to properly pass through the recognized road, based on the road shape recognized by the road shape recognizing device;
   a comparing device that compares the vehicle state detected by the vehicle state detecting device with the proper vehicle state set by the proper vehicle state setting device; and
   a brake assist control device that increases brake pressure when the driver's brake operation has been detected by the brake operation detecting device if the vehicle state of the present vehicle is not the proper vehicle state as a result of the comparison by the comparing device,
   wherein the brake assist control device calculates an initial brake assist pressure based on the comparison result of the comparing device, and changes a brake assist pressure in proportion to the brake operation of the driver when a change in the brake operation by the driver has been detected after start of brake assist control based on the initial brake assist pressure.

2. The traveling safety device for a vehicle according to claim 1, wherein:
   the brake device includes a master cylinder that transmits a force of the driver's brake operation; and
   the brake assist control device
      adopts as a reference value a ratio between a pressure of the master cylinder and a brake assist pressure after a predetermined time from the start of brake assist control, and
      calculates the brake assist pressure based on the reference value and an increased or reduced master cylinder pressure, when an increase or reduction in the master cylinder pressure has been detected after elapse of the predetermined time.

3. The traveling safety device for a vehicle according to claim 1, wherein:
   the brake device includes a master cylinder that transmits a force of the driver's brake operation; and
   the brake assist control device
      adopts as a reference value a ratio between a pressure of the master cylinder and a brake assist pressure at the time of the holding of a brake operation, when holding of a brake operation by the driver has been detected after the start of brake assist control, and
      calculates the brake assist pressure based on the reference value and an increased or reduced master cylinder pressure, when an increase or reduction in the master cylinder pressure has been detected after the holding of a brake operation.

4. The traveling safety device for a vehicle according to claim 1, wherein:
   the brake device includes a master cylinder that transmits a force of the driver's brake operation, and a brake wheel cylinder that generates the brake force; and the brake assist control device adopts as a reference value a ratio between a pressure of the master cylinder and a pressure of the brake wheel cylinder after a predetermined time from the start of brake assist control, and calculates the brake assist pressure based on the reference value and an increased or reduced master cylinder pressure, when an increase or reduction in the master cylinder pressure has been detected after elapse of the predetermined time.

5. The traveling safety device for a vehicle according to claim 1, wherein:

the brake device includes a master cylinder that transmits a force of the driver's brake operation, and a brake wheel cylinder that generates the brake force; and the brake assist control device adopts as a reference value a ratio between a pressure of the master cylinder and a pressure of the brake wheel cylinder at the time of the holding of a brake operation, when holding of a brake operation by the driver has been detected after the start of brake assist control, and calculates the brake assist pressure based on the reference value and an increased or reduced master cylinder pressure, when an increase or reduction in the master cylinder pressure has been detected after the holding of a brake operation.

* * * * *